(12) United States Patent
Wang et al.

(10) Patent No.: US 10,966,003 B2
(45) Date of Patent: Mar. 30, 2021

(54) METHOD AND SYSTEM FOR IMPLEMENTING SDO FUNCTION, AND SDON SYSTEM

(71) Applicant: ZTE CORPORATION, Shenzhen (CN)

(72) Inventors: Dajiang Wang, Shenzhen (CN); Zhenyu Wang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 229 days.

(21) Appl. No.: 16/084,019

(22) PCT Filed: Feb. 13, 2017

(86) PCT No.: PCT/CN2017/073406
§ 371 (c)(1),
(2) Date: Sep. 11, 2018

(87) PCT Pub. No.: WO2017/152735
PCT Pub. Date: Sep. 14, 2017

(65) Prior Publication Data
US 2020/0296485 A1  Sep. 17, 2020

(30) Foreign Application Priority Data
Mar. 11, 2016  (CN) .......................... 201610139937.6

(51) Int. Cl.
*H04Q 11/00* (2006.01)
*H04B 10/27* (2013.01)
(Continued)

(52) U.S. Cl.
CPC ......... *H04Q 11/0005* (2013.01); *H04B 10/27* (2013.01); *H04L 45/04* (2013.01); *H04L 45/12* (2013.01)

(58) Field of Classification Search
CPC .... H04Q 11/0005; H04B 10/27; H04L 12/28; H04L 47/22; H04L 45/3065; H04L 45/04;
(Continued)

(56) References Cited

U.S. PATENT DOCUMENTS 7,818,450 B2 * 10/2010 Chen ..................... H04L 45/308
  709/238
8,346,079 B2    1/2013 Lee
(Continued)

FOREIGN PATENT DOCUMENTS

CN    102783066 A    11/2012
CN    103051565 A    4/2013
(Continued)

OTHER PUBLICATIONS

International Search Report in the international application No. PCT/CN2017/073406, dated May 4, 2017, 2 pgs.
(Continued)

*Primary Examiner* — Abbas H Alagheband
(74) *Attorney, Agent, or Firm* — Cooper Legal Group, LLC

(57) ABSTRACT

Provided are a method and system for implementing an SDO function, and a SDON system. The method comprises: when a service connection establishment request transmitted from an application layer is received, determining whether the service connection establishment request is a cross-domain service connection establishment request, the service connection establishment request comprising: a routing constraint of a connection to be established and a hop-by-hop tuning policy; if yes, executing a routing and tuning algorithm on the basis of inter-domain service connection establishment request information and performance information of a domain boundary optical component node in the service connection establishment request according to the routing
(Continued)

constraint and the hop-by-hop tuning policy; generating, on the basis of the result of executing the routing and tuning algorithm, inter-domain cross-connection attribute configuration parameters of optical component nodes through which an inter-domain service connection path and an inter-domain service connection path pass.

14 Claims, 7 Drawing Sheets

(51) Int. Cl.
*H04L 12/721* (2013.01)
*H04L 12/715* (2013.01)

(58) Field of Classification Search
CPC ....... H04L 45/302; H04L 45/64; H04L 45/02; H04L 47/2425; H04L 47/2408; H04L 45/42; H04L 45/50; H04L 45/308; H04L 45/12
USPC .......................................................... 398/58
See application file for complete search history.

(56) References Cited

U.S. PATENT DOCUMENTS

| | | | |
|---|---|---|---|
| 8,923,695 B2 | 12/2014 | Lee et al. | |
| 9,392,348 B2 | 7/2016 | Lee et al. | |
| 9,699,116 B2* | 7/2017 | Zhang | H04L 45/42 |
| 2005/0265255 A1* | 12/2005 | Kodialam | H04L 45/24 |
| | | | 370/252 |
| 2006/0075082 A1* | 4/2006 | Haga | H04L 67/06 |
| | | | 709/223 |
| 2008/0130627 A1* | 6/2008 | Chen | H04L 47/22 |
| | | | 370/351 |
| 2010/0220996 A1* | 9/2010 | Lee | H04Q 11/0005 |
| | | | 398/25 |
| 2013/0077970 A1 | 3/2013 | Lee et al. | |
| 2013/0330079 A1* | 12/2013 | Kauffeldt | H04J 14/0221 |
| | | | 398/79 |
| 2014/0003232 A1* | 1/2014 | Guichard | H04L 67/1029 |
| | | | 370/230 |
| 2015/0063802 A1* | 3/2015 | Bahadur | H04L 45/125 |
| | | | 398/49 |
| 2015/0063804 A1 | 3/2015 | Lee et al. | |
| 2016/0234578 A1* | 8/2016 | Sareen | H04L 45/124 |
| 2016/0352648 A1* | 12/2016 | Iovanna | H04L 45/02 |
| 2018/0123945 A1* | 5/2018 | Wang | H04L 45/64 |

FOREIGN PATENT DOCUMENTS

| | | |
|---|---|---|
| CN | 105282025 A | 1/2016 |
| EP | 1659729 A1 | 5/2006 |
| EP | 2843888 A1 | 3/2015 |
| WO | 2010097049 A1 | 9/2010 |

OTHER PUBLICATIONS

English translation of the Written Opinion of the International Search Authority in the international application No. PCT/CN2017/073406, dated May 4, 2017, 4 pgs.
Supplementary European Search Report in the European application No. 17762421.0, dated Feb. 4, 2019, 9 pgs.

* cited by examiner

| number of optical input port | number of carriers m | center frequency 1 | channel spectral width 1 | mode of modulation 1 |
|---|---|---|---|---|
| | | center frequency 2 | channel spectral width 2 | mode of modulation 2 |
| | | . . . | . . . | . . . |
| | | center frequency m | channel spectral width m | mode of modulation m |
| number of optical output port | number of carriers n | center frequency 1 | channel spectral width 1 | mode of modulation 1 |
| | | center frequency 2 | channel spectral width 2 | mode of modulation 2 |
| | | . . . | . . . | . . . |
| | | center frequency n | channel spectral width n | mode of modulation n |

FIG. 7

METHOD AND SYSTEM FOR IMPLEMENTING SDO FUNCTION, AND SDON SYSTEM

TECHNICAL FIELD

The present disclosure relates to the field of communication via an optical network, and in particular to a method and system for implementing Software Definition of an Optical device (SDO), and a system of a Software Defined Optical Network (SDON).

BACKGROUND

In the field of optical communication, research on transmission beyond 100 Gigabytes per second (Gb/s) has been started years ago in the industry to meet a greater bandwidth of transmission, a longer distance of transmission, higher sensitivity in receiving, etc., and lower a cost of optical transmission. An era of optical transmission beyond 100G, such as that of 400 Gb/s or even 1 Terabytes per second (Tb/s), etc., is around the corner.

A technical advantage and potency of applying an elastic optical network beyond 100G cannot be put to full play, if a model of a resource (such as a spectrum, a bandwidth, a mode of modulation, etc.) of an optical network that can be scheduled flexibly as provided in transmission beyond 100G cannot be programmed directly as needed by a user of an application layer. Architecture of an optical network based on an SDON has been launched in recent years, allowing a user to adjust a resource for optical transmission dynamically by software programming, allowing better adaptation to a demand of a service, improving utilization of a network. With SDON based optical network architecture, a resource for optical transmission, such as a device, a node, a network, etc., may be programmed.

Capability and characteristic to program a resource for optical transmission may be based on capability to program an optical device, which allows node equipment to be featured by flexible programmability. Such capability to program may be open to a user of an application layer, to allow an entire optical transfer network to have stronger software defined characteristic, enhancing resource utilization and overall performance of an optical network, supporting more optical network applications. Therefore, it is of vital importance to implement a programmable optical device.

However, there has been neither any specific solution nor SDON architecture for supporting SDO in the industry. A significant problem pressing for a solution in future control of optical transmission beyond 100G is how to allow, based on an existing SDON architecture, a user to program a resource, such as a mode of modulation, etc., of an elastic optical network beyond 100G based on a tuning attribute of an optical device.

SUMMARY

Embodiments herein provide a method and system for implementing SDO, and a system of an SDON, capable of allowing, based on an existing SDON architecture, a user to program a resource of an elastic optical network beyond 100G based on a tuning attribute of an optical device, such as a mode of modulation, etc.

A technical solution according to an embodiment herein is as follows.

According to an aspect herein, a method for implementing Software Definition of an Optical device (SDO) according to an embodiment herein may apply to a controller of multiple domains of a Software Defined Optical Network (SDON) in a system of the SDON. The method includes options as follows.

When a request for establishing a connection of a service sent by an application layer is received, it is determined whether the request for establishing the connection of the service is a request for establishing a connection of a domain crossing service. The request for establishing the connection of the service may include a routing constraint on routing of a connection to be established, a strategy of tuning hop by hop, etc.

When the request is for a domain crossing service, a routing and tuning algorithm is executed according to the routing constraint and the strategy of tuning hop by hop, and according to information on performance of an optical device node at a domain boundary and information on a request for establishing a connection of an inter-domain service. Both the information on the performance of the optical device node at the domain boundary and the information on the request for establishing the connection of the inter-domain service are included in the request for establishing the connection of the service.

A path for the connection of the inter-domain service and a parameter for configuring an attribute of an inter-domain cross connection are generated according to a result of executing the routing and tuning algorithm. The path for the connection of the inter-domain service corresponds to the information on the request for establishing the connection of the inter-domain service. The parameter for configuring the attribute of the inter-domain cross connection is of an optical device node on the path for the connection of the inter-domain service.

The method may further include: after determining whether the request for establishing the connection of the service is a request for establishing a connection of a domain crossing service, in response to determining that the request is for no domain crossing service, sending the request for establishing the connection of the service to a controller of a single domain of a Software Defined Optical Network (SDON) corresponding to the request for establishing the connection of the service.

The method may further include: after determining whether the request for establishing the connection of the service is a request for establishing a connection of a domain crossing service, in response to determining that the request is for a domain crossing service, sending information on a request for establishing a connection of an intra-domain service in the request for establishing the connection of the service to a controller of a single domain of a Software Defined Optical Network (SDON) corresponding to the request for establishing the connection of the intra-domain service.

The method may further include: after generating, according to a result of executing the routing and tuning algorithm, a path for the connection of the inter-domain service and a parameter for configuring an attribute of an inter-domain cross connection, in response to receiving a tuning request for tuning an optical device node on a path for a connection of a service sent by the application layer, determining whether the path for the connection of the service is a path for the connection of the domain crossing service, the tuning request including information on a tuning attribute;

in response to determining that the path is for the domain crossing service, modifying the parameter for configuring the attribute of the inter-domain cross connection according to the information on the tuning attribute and tuning request information corresponding to the path for the connection of the inter-domain service in the tuning request.

The method may further include: after determining whether the path for the connection of the service is a path for the connection of the domain crossing service, in response to determining that the path is for the domain crossing service, sending tuning request information corresponding to a path for a connection of an intra-domain service in the tuning request to a controller of a single domain of a Software Defined Optical Network (SDON) corresponding to the path for the connection of the intra-domain service.

The method may further include: after determining whether the path for the connection of the service is a path for the connection of the domain crossing service, in response to determining that the path is for no domain crossing service, sending the tuning request to a controller of a single domain of a Software Defined Optical Network (SDON) corresponding to the tuning request.

The parameter for configuring the attribute of the inter-domain cross connection may include at least:

a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier.

The strategy of tuning hop by hop may include at least one tuning parameter of: spectral efficiency, a mode of modulation, a number of carriers, or tolerance for an Optical Signal-to-Noise Ratio (OSNR) of an optical transceiver; or a range of output power or a range of input power of an optical amplifier.

According to an aspect herein, a method for implementing Software Definition of an Optical device (SDO) according to an embodiment herein may apply to a controller of a single domain of a Software Defined Optical Network (SDON) in a system of the SDON. The method includes:

receiving a request for establishing a connection of a service sent by a controller of multiple domains of a Software Defined Optical Network (SDON), the request for establishing the connection of the service including a routing constraint on routing of a connection to be established and a strategy of tuning hop by hop;

executing a routing and tuning algorithm according to the routing constraint, the strategy of tuning hop by hop, the request for establishing the connection of the service, and information on performance of an optical device node inside a domain;

generating, according to a result of executing the routing and tuning algorithm, a path for the connection of the service corresponding to the request for establishing the connection of the service and a parameter for configuring an attribute of an intra-domain cross connection of an optical device node on the path for the connection of the service.

The method may further include:

receiving a tuning request for tuning the optical device node on the path for the connection of the service sent by the controller of the multiple domains of the SDON, the tuning request including information on a tuning attribute;

modifying the parameter for configuring the attribute of the intra-domain cross connection according to the information on the tuning attribute.

The parameter for configuring the attribute of the intra-domain cross connection may include at least:

a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier.

The strategy of tuning hop by hop may include at least one tuning parameter of: spectral efficiency, a mode of modulation, a number of carriers, or tolerance for an Optical Signal-to-Noise Ratio (OSNR) of an optical transceiver; or a range of output power or a range of input power of an optical amplifier.

According to an aspect herein, a system for implementing Software Definition of an Optical device (SDO) according to an embodiment herein includes a first determining module, a first routing/tuning module, and a first generating module.

The first determining module is arranged for: in response to receiving a request for establishing a connection of a service sent by an application layer, determining whether the request for establishing the connection of the service is a request for establishing a connection of a domain crossing service. The request for establishing the connection of the service includes a routing constraint on routing of a connection to be established and a strategy of tuning hop by hop.

The first routing/tuning module is arranged for: in response to determining that the request is for a domain crossing service, executing a routing and tuning algorithm according to the routing constraint and the strategy of tuning hop by hop, and according to information on performance of an optical device node at a domain boundary and information on a request for establishing a connection of an inter-domain service. Both the information on the performance of the optical device node at the domain boundary and the information on the request for establishing the connection of the inter-domain service are included in the request for establishing the connection of the service.

The first generating module is arranged for: generating, according to a result of executing the routing and tuning algorithm, a path for the connection of the inter-domain service and a parameter for configuring an attribute of an inter-domain cross connection. The path for the connection of the inter-domain service corresponds to the information on the request for establishing the connection of the inter-domain service. The parameter for configuring the attribute of the inter-domain cross connection is of an optical device node on the path for the connection of the inter-domain service.

The system may further include a first request sending module arranged for:

in response to determining that the request is for no domain crossing service, sending the request for establishing the connection of the service to a controller of a single domain of a Software Defined Optical Network (SDON) corresponding to the request for establishing the connection of the service.

The system may further include a second request sending module arranged for:

in response to determining that the request is for a domain crossing service, sending information on a request for establishing a connection of an intra-domain service in the request for establishing the connection of the service to a controller of a single domain of a Software Defined Optical Network (SDON) corresponding to the request for establishing the connection of the intra-domain service.

The system may further include a second determining module and a first parameter modifying module.

The second determining module may be arranged for: in response to receiving a tuning request for tuning an optical device node on a path for a connection of a service sent by the application layer, determining whether the path for the connection of the service is a path for the connection of the domain crossing service. The tuning request may include information on a tuning attribute.

The first parameter modifying module may be arranged for: in response to determining that the path is for the domain crossing service, modifying the parameter for configuring the attribute of the inter-domain cross connection according to the information on the tuning attribute and tuning request information corresponding to the path for the connection of the inter-domain service in the tuning request.

The system may further include a third request sending module arranged for:

in response to determining that the path is for the domain crossing service, sending tuning request information corresponding to a path for a connection of an intra-domain service in the tuning request to a controller of a single domain of a Software Defined Optical Network (SDON) corresponding to the path for the connection of the intra-domain service.

The system may further include a fourth request sending module arranged for:

in response to determining that the path is for no domain crossing service, sending the tuning request to a controller of a single domain of a Software Defined Optical Network (SDON) corresponding to the tuning request.

The first determining module, the first routing/tuning module, the first generating module, the first request sending module, the second request sending module, the second determining module, the first parameter modifying module, the third request sending module, and/or the fourth request sending module may be implemented by a Central Processing Unit (CPU), a Digital Signal Processor (DSP), a Field-Programmable Gate Array (FPGA), etc.

According to an aspect herein, a system for implementing Software Definition of an Optical device (SDO) according to an embodiment herein includes a first receiving module, a second routing/tuning module, and a second generating module.

The first receiving module is arranged for: receiving a request for establishing a connection of a service sent by a controller of multiple domains of a Software Defined Optical Network (SDON). The request for establishing the connection of the service includes a routing constraint on routing of a connection to be established and a strategy of tuning hop by hop.

The second routing/tuning module is arranged for: executing a routing and tuning algorithm according to the routing constraint, the strategy of tuning hop by hop, the request for establishing the connection of the service, and information on performance of an optical device node inside a domain.

The second generating module is arranged for: generating, according to a result of executing the routing and tuning algorithm, a path for the connection of the service corresponding to the request for establishing the connection of the service and a parameter for configuring an attribute of an intra-domain cross connection of an optical device node on the path for the connection of the service.

The controller of the single domain of the SDON may further include a second receiving module and a second parameter modifying module.

The second receiving module may be arranged for: receiving a tuning request for tuning the optical device node on the path for the connection of the service sent by the controller of the multiple domains of the SDON. The tuning request may include information on a tuning attribute.

The second parameter modifying module may be arranged for: modifying the parameter for configuring the attribute of the intra-domain cross connection according to the information on the tuning attribute.

The first receiving module, the second routing/tuning module, the second generating module, the second receiving module, and/or the second parameter modifying module may be implemented by a CPU, a DSP, an FPGA, etc.

According to an aspect herein, a system of an SDON herein may include the system for implementing SDO according to an embodiment and the system for implementing SDO according to another embodiment.

Beneficial effects of embodiments herein are as follows.

With the solution, a novel system of an SDON is designed based on connection path computation of an existing controller of an SDON. Optical device tuning per path hop is added on basis of architecture of a controller of an SDON. Path tuning is added during establishment of a connection of a service. An attribute of an optical device is defined by software by attribute tuning, implementing an important functional mechanism of SDO, to allow a user of an application layer to program and define a resource of an elastic optical device beyond 100G.

BRIEF DESCRIPTION OF THE DRAWINGS

FIG. 7 is a diagram of a structure of content of information on an Openflow entry of a parameter for configuring an attribute of a cross connection herein.

DETAILED DESCRIPTION

Figure 1:
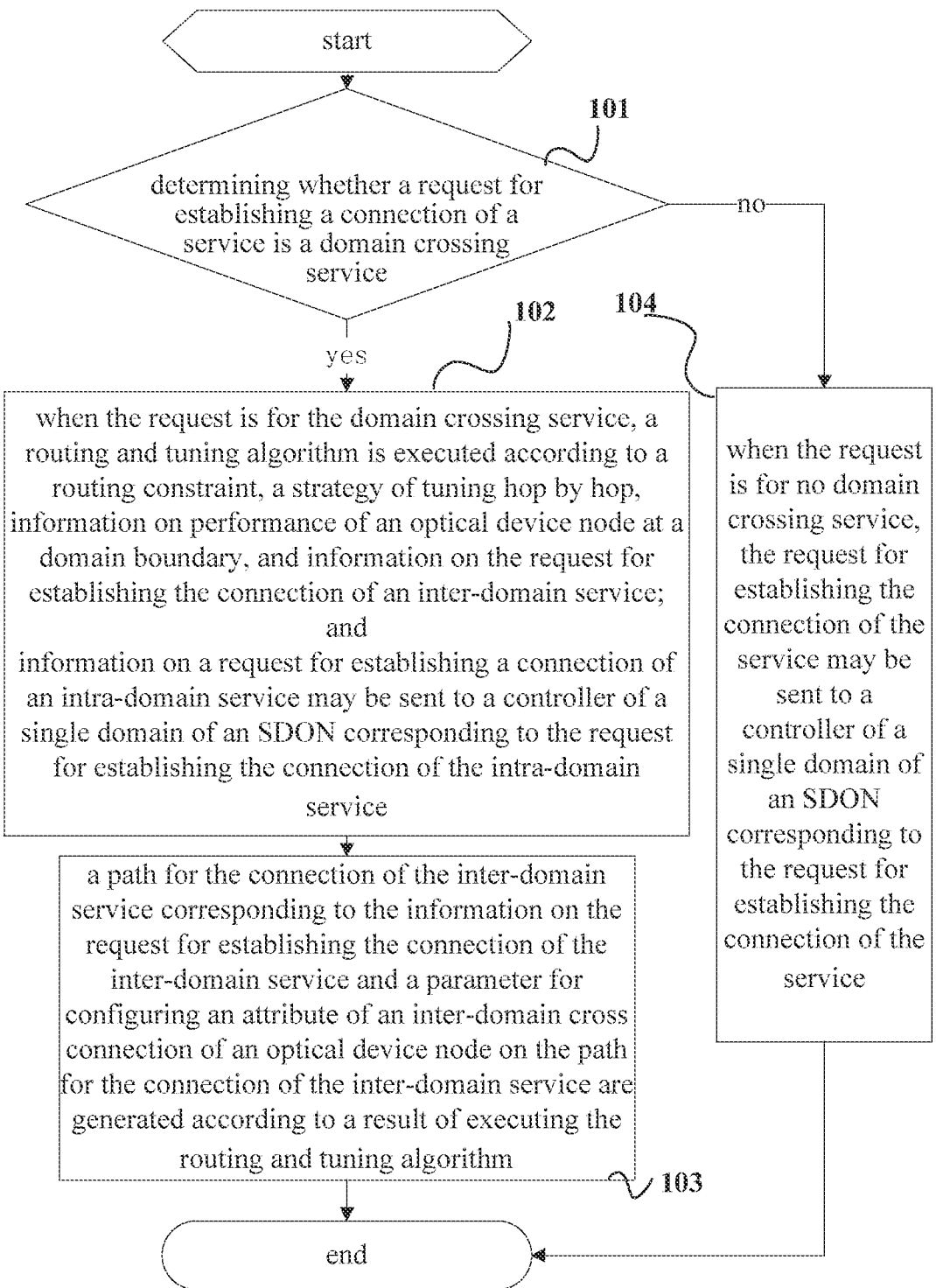
FIG. 1 is a flowchart according to an embodiment herein.

Exemplary embodiments herein will be elaborated below with reference to the drawings. Note that although exemplary embodiments herein are shown in the drawings, the present disclosure may be implemented in various forms without being limited by embodiments illustrated herein. Rather, the embodiments are provided to allow a thorough understanding of the present disclosure, and to deliver the complete scope of the present disclosure to those skilled in the art.

As shown in FIG. 1, a method for implementing Software Definition of an Optical device (SDO) according to an embodiment herein may apply to a controller of multiple domains of a Software Defined Optical Network (SDON) in a system of the SDON. The method includes options as follows.

In option 101, when a request for establishing a connection of a service sent by an application layer is received, it is determined whether the request for establishing the connection of the service is a request for establishing a connection of a domain crossing service.

The request for establishing the connection of the service may include a routing constraint on routing of a connection to be established, a strategy of tuning hop by hop, etc. The routing constraint may include an attribute of Bandwidth On Demand (BOD) service. The strategy of tuning hop by hop may include tuning request information, such as a mode of modulation, etc.

In option 102, when the request is for a domain crossing service, a routing and tuning algorithm is executed according to the routing constraint and the strategy of tuning hop by hop, and according to information on performance of an optical device node at a domain boundary and information on a request for establishing a connection of an inter-domain service. Both the information on the performance of the optical device node at the domain boundary and the information on the request for establishing the connection of the inter-domain service are included in the request for establishing the connection of the service.

When it is determined that the request for establishing the connection of the service is the request for establishing the connection of the domain crossing service, the request for establishing the connection of the domain crossing service may be divided into two parts to be processed, that is, an inter-domain part and a part inside a single domain. The option mainly processes the request for establishing the connection of the service of the inter-domain part. Information on a resource at a domain crossing virtual network layer may have to be acquired in real time. The information on the resource at the domain crossing virtual network layer may include information on performance of an optical device node at a domain boundary. For example, the information on the resource at the domain crossing virtual network layer may include information on a model of an optical device node such as an optical transmitter/receiver, an optical amplifier, an adjustable dispersion compensator, etc. When it is determined that the request for establishing the connection of the service is the request for establishing the connection of the domain crossing service, a routing and tuning algorithm is executed according to the information on the performance of the optical device node at the domain boundary, to process responsively the part of the request for establishing the connection of the inter-domain service in the request for establishing the connection of the service.

Information on performance of an optical device node at a domain boundary may include information on topology of the node, information on a state of work, information on physical performance of the optical device, etc. A routing and tuning algorithm may include function of at least one of an algorithm for Routing and Wavelength Assignment (RWA), an algorithm for Routing and Spectrum Allocation (RSA), or an algorithm for Amplifier Power Balancing (APB).

In option 103, a path for the connection of the inter-domain service and a parameter for configuring an attribute of an inter-domain cross connection are generated according to a result of executing the routing and tuning algorithm. The path for the connection of the inter-domain service corresponds to the information on the request for establishing the connection of the inter-domain service. The parameter for configuring the attribute of the inter-domain cross connection is of an optical device node on the path for the connection of the inter-domain service.

A routing and tuning algorithm may serve to constrain and optimize path computation. A path for the connection of the inter-domain service and a parameter for configuring an attribute of an inter-domain cross connection of an optical device node on the path for the connection of the inter-domain service may be acquired according to a result of executing the routing and tuning algorithm as follows. Establishment of a path for an inter-domain connection may be controlled by generating, and configuring a parameter for, an optical cross connection or a digital cross connection (OXC/DXC) on a node at a domain boundary on each connection of a service. A parameter for configuring an attribute of an inter-domain cross connection may be generated to allow an application layer to perform a further operation later on, such as to delete, modify an attribute of, search, etc., a path for a connection of a service and an optical device node thereon.

Such a parameter for configuring an attribute of an inter-domain cross connection may be generated during establishment of a connection of a service. The generated parameter may be sent to an equipment layer to control routing of the equipment layer, to complete software definition of an optical device. Such a parameter for configuring an attribute of an inter-domain cross connection may be information on an Openflow entry of an optical cross connection (OXC), applying to any equipment of optical transmission, and in particular to equipment of optical transmission beyond 100G.

With the method, a novel system of an SDON is designed based on connection path computation of an existing controller of an SDON. Optical device tuning per path hop is added on basis of architecture of a controller of an SDON. Path tuning is added during establishment of a connection of a service. An attribute of an optical device is defined by software by attribute tuning, implementing an important functional mechanism of SDO, to allow a user of an application layer to program and define a resource of an elastic optical device beyond 100G.

After it has been determined whether the request for establishing the connection of the service is a request for establishing a connection of a domain crossing service, when the request is for a domain crossing service, information on a request for establishing a connection of an intra-domain service in the request for establishing the connection of the service may be sent to a controller of a single domain of an SDON corresponding to the request for establishing the connection of the intra-domain service.

Namely, when the request for establishing the connection of the service is the request for establishing the connection of the domain crossing service, while the part of the request for establishing the connection of the inter-domain service in the request for establishing the connection of the service is being processed, the information on the request for establishing the connection of the intra-domain service in the request for establishing the connection of the service may be sent directly to a controller of a single domain of an SDON corresponding to the request for establishing the connection of the intra-domain service, so as to be processed.

After it has been determined whether the request for establishing the connection of the service is a request for establishing a connection of a domain crossing service, when the request is for no domain crossing service, the request for establishing the connection of the service may be sent to a controller of a single domain of an SDON corresponding to the request for establishing the connection of the service at 104.

When the request for establishing the connection of the service is not a request for establishing a connection of a domain crossing service, the request for establishing the connection of the service may be taken as information on the request for establishing the connection of the intra-domain service, which may be sent directly to a controller of a single domain of an SDON corresponding to the request for establishing the connection of the intra-domain service, so as to be processed.

A method for implementing Software Definition of an Optical device (SDO) according to an embodiment herein may apply to a controller of multiple domains of a Software Defined Optical Network (SDON) in a system of the SDON.

The method includes options as follows. When a request for establishing a connection of a service sent by an application layer is received, it is determined whether the request for establishing the connection of the service is a request for establishing a connection of a domain crossing service. The request for establishing the connection of the service may include a routing constraint on routing of a connection to be established, a strategy of tuning hop by hop, etc. When the request is for a domain crossing service, a routing and tuning algorithm is executed according to the routing constraint and the strategy of tuning hop by hop, and according to information on performance of an optical device node at a domain boundary and information on a request for establishing a connection of an inter-domain service. Both the information on the performance of the optical device node at the domain boundary and the information on the request for establishing the connection of the inter-domain service are included in the request for establishing the connection of the service. A path for the connection of the inter-domain service and a parameter for configuring an attribute of an inter-domain cross connection are generated according to a result of executing the routing and tuning algorithm. The path for the connection of the inter-domain service corresponds to the information on the request for establishing the connection of the inter-domain service. The parameter for configuring the attribute of the inter-domain cross connection is of an optical device node on the path for the connection of the inter-domain service.

Figure 2:
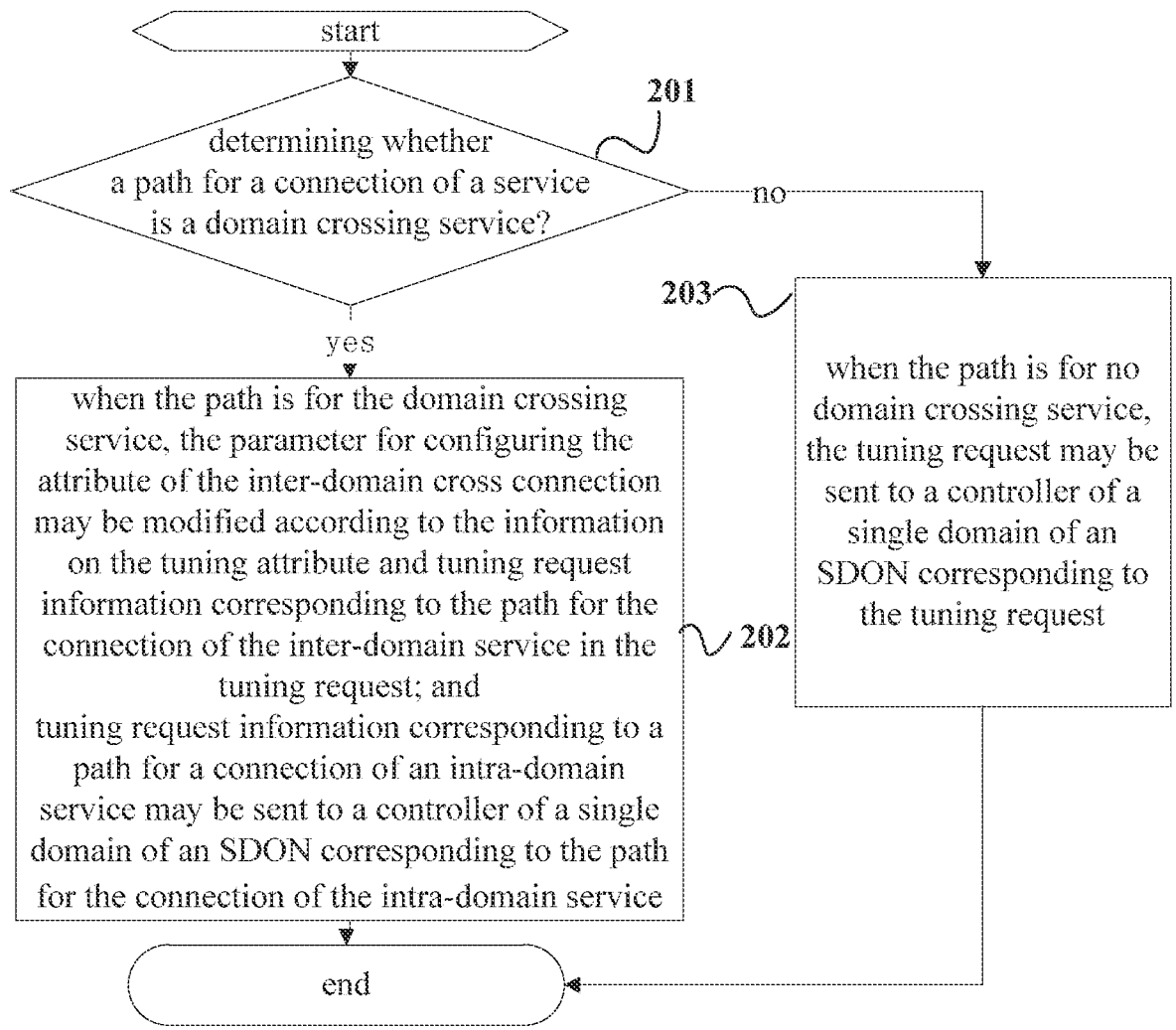
FIG. 2 is a flowchart according to an embodiment herein.

As shown in FIG. 2, after a path for the connection of the inter-domain service and a parameter for configuring an attribute of an inter-domain cross connection have been generated according to a result of executing the routing and tuning algorithm, the method may further include options as follows.

In option 201, when a tuning request for tuning an optical device node on a path for a connection of a service sent by the application layer is received, it may be determined whether the path for the connection of the service is a path for the connection of the domain crossing service.

The tuning request may include information on a tuning attribute.

When the path for the connection of the service is a path for the connection of the domain crossing service, the tuning request may be divided into two parts to be processed, that is, a part of request for inter-domain tuning and a part of request for tuning inside a single domain.

In option 202, when the path is for the domain crossing service, the parameter for configuring the attribute of the inter-domain cross connection may be modified according to the information on the tuning attribute and tuning request information corresponding to the path for the connection of the inter-domain service in the tuning request.

When the path for the connection of the service is a path for the connection of the domain crossing service, the parameter for configuring the attribute of the inter-domain cross connection may be modified according to a part of request for inter-domain tuning in the tuning request sent by a user of an application layer.

With the method, a user of an application layer may modify a parameter for configuring an attribute of an inter-domain cross connection of a node on a path for a connection of a service online in SDON architecture. A function of optical device attribute tuning per path hop is added, such that an attribute of an optical device is defined by software by attribute tuning.

After it has been determined whether the path for the connection of the service is a path for the connection of the domain crossing service, when the path is for the domain crossing service, tuning request information corresponding to a path for a connection of an intra-domain service in the tuning request may be sent to a controller of a single domain of an SDON corresponding to the path for the connection of the intra-domain service.

Namely, when the path for the connection of the service is a path for the connection of the domain crossing service, while a part of request for inter-domain tuning in the tuning request is being processed, a part of request for intra-domain tuning may be sent directly to a controller of a single domain of an SDON corresponding to the request for intra-domain tuning, so as to be tuned.

After it has been determined whether the path for the connection of the service is a path for the connection of the domain crossing service, when the path is for no domain crossing service, the tuning request may be sent to a controller of a single domain of an SDON corresponding to the tuning request at 203.

When the path for the connection of the service is no path for the connection of the domain crossing service, the tuning request may be determined to be a request for tuning an intra-domain node attribute, which may be sent directly to a controller of a single domain of an SDON corresponding to the request for tuning the intra-domain node attribute, so as to be processed.

Such a parameter for configuring an attribute of an inter-domain cross connection may include at least: a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier, etc.

Such a parameter for configuring an attribute of an inter-domain cross connection may be generated during establishment of a connection of a service. The generated parameter may be sent to an equipment layer to control routing of the equipment layer. Such a parameter for configuring an attribute of an inter-domain cross connection may be information on an Openflow entry of an optical cross connection (OXC), applying to any equipment of optical transmission, and in particular to equipment of optical transmission beyond 100G. An attribute of a port of an OXC may be defined according to a direction from a source to a destination of a connection of an OXC service as follows. An upstream port of a cross may be an optical input port. A downstream port of a cross may be an optical output port.

Information on an Openflow entry of an OXC mainly may include: a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier, etc., as shown in FIG. 7.

A center frequency may have a value in a form such as 193.1 THz+k*0.00625 THz (k being an integer). A channel spectral width may have a value in a form such as 12.5 GHz*h (h being a positive integer). A mode of modulation may have a value in a form such as 4, which stands for Dual Polarization-Quadrature Phase Shift Keying (DP-QPSK); 16, which stands for Dual Polarization multiplexing 16 Quadrature Amplitude Modulation (DP-16QAM); 64, which stands for Dual Polarization multiplexing 64 Quadrature Amplitude Modulation (DP-64QAM), etc.

A strategy of tuning hop by hop may include at least one tuning parameter of: spectral efficiency, a mode of modulation, a number of carriers, or tolerance for an Optical Signal-to-Noise Ratio (OSNR) of an optical transceiver; or a range of output power or a range of input power of an optical amplifier, etc.

With introduction of coherent reception, multi-carrier based Orthogonal Frequency Division Multiplexing (OFDM) is about to mature. For each connection of a service borne on multiple carriers in a system beyond 100G, information such as a mode of modulation, a signal spectral width, a center frequency of each carrier in an entry of an OXC, etc., may have to be determined. Two cases may be involved, mainly. For an equipment node on a connection of a service capable of hybrid scheduling of both light and electricity or capable of serving as a transponder in an optical transfer network (OTN). Information on an Openflow entry of an OXC at the optical input port and/or the optical output port may be derived by routing constraint and tuning strategy optimization respectively according to an indicator such as an upstream distance of transfer, a downstream distance of transfer of the OXC, tolerance for an OSNR, etc. For an equipment node capable of but optical crossing, a principle such as continuity, consistency of spectra, etc., may have to be followed, to ensure consistency of information on entries at an optical input port and an optical output port of a cross.

Figure 3:
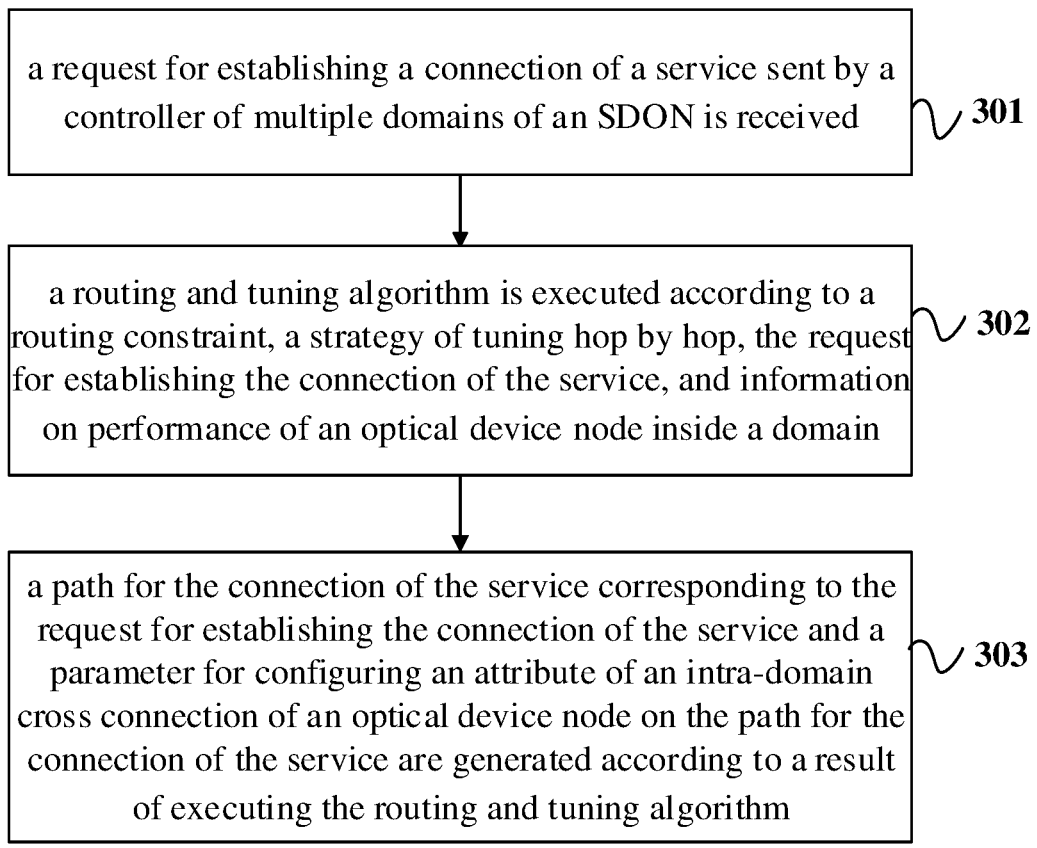
FIG. 3 is a flowchart according to an embodiment herein.

As shown in FIG. 3, a method for implementing Software Definition of an Optical device (SDO) according to an embodiment herein may apply to a controller of a single domain of a Software Defined Optical Network (SDON) in a system of the SDON. The method includes options as follows.

In option 301, a request for establishing a connection of a service sent by a controller of multiple domains of a Software Defined Optical Network (SDON) is received.

The request for establishing the connection of the service includes a routing constraint on routing of a connection to be established, a strategy of tuning hop by hop, etc.

A request for establishing a connection of a service sent by a controller of multiple domains of an SDON may include a request for establishing a connection of a non-domain-crossing service sent to the controller of the multiple domains of the SDON by a user of an application layer, part of a request for establishing a connection of a domain crossing service that requests for establishing a connection of an intra-domain service sent to the controller of the multiple domains of the SDON by a user of an application layer, etc.

In option 302, a routing and tuning algorithm is executed according to the routing constraint, the strategy of tuning hop by hop, the request for establishing the connection of the service, information on performance of an optical device node inside a domain, etc.

Information on performance of a model of an optical device node inside a domain, such as information on a resource at a domain crossing virtual network layer including information on a model such as an optical transmitter/receiver, an optical amplifier, an adjustable dispersion compensator, etc., may have to be acquired in real time. A request for establishing a connection of a service may be processed, and a routing and tuning algorithm may be executed based on information on performance of an optical device node inside a domain. Computation for routing adjustment during establishment of a connection of a service may be performed according to a strategy input by a user of an application layer to fully meet a need of the user.

Information on performance of an optical device node inside a domain may include information on topology of the node, information on a state of work, information on physical performance of the optical device, etc. A routing and tuning algorithm may include function of at least one of an algorithm for Routing and Wavelength Assignment (RWA), an algorithm for Routing and Spectrum Allocation (RSA), or an algorithm for Amplifier Power Balancing (APB).

In option 303, a path for the connection of the service corresponding to the request for establishing the connection of the service and a parameter for configuring an attribute of an intra-domain cross connection of an optical device node on the path for the connection of the service are generated according to a result of executing the routing and tuning algorithm.

A routing and tuning algorithm may serve to constrain and optimize path computation. A path for the connection of the service and a parameter for configuring an attribute of an intra-domain cross connection of an optical device node on the path for the connection of the service may be acquired according to a result of executing the routing and tuning algorithm as follows. Establishment of a path for an intra-domain connection may be controlled by generating, and configuring a parameter for, an optical cross connection or a digital cross connection (OXC/DXC) on an intra-domain node on each connection of a service. A parameter for configuring an attribute of an intra-domain cross connection may be generated to allow an application layer to perform a further operation later on, such as to delete, modify an attribute of, search, etc., a path for a connection of a service and an optical device node thereon.

Such a parameter for configuring an attribute of an intra-domain cross connection may be generated during establishment of a connection of a service. The generated parameter may be sent to an equipment layer to control routing of the equipment layer, to complete software definition of an optical device. Such a parameter for configuring an attribute of an intra-domain cross connection may be information on an Openflow entry of an optical cross connection (OXC), applying to any equipment of optical transmission, and in particular to equipment of optical transmission beyond 100G.

With the method, a novel system of an SDON is designed based on connection path computation of an existing controller of an SDON. Optical device tuning per path hop is added on basis of architecture of a controller of an SDON. Path tuning is added during establishment of a connection of a service. An attribute of an optical device is defined by software by attribute tuning, implementing an important functional mechanism of SDO, to allow a user of an application layer to program and define a resource of an elastic optical device beyond 100G.

Figure 4:
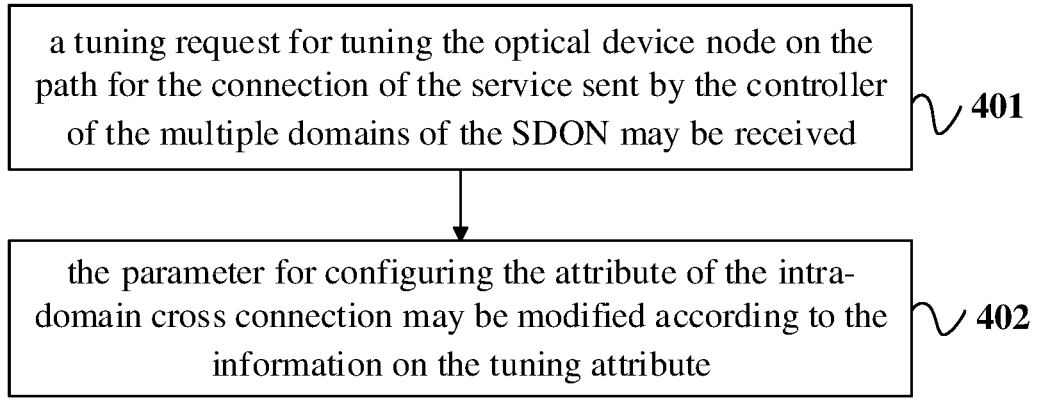
FIG. 4 is a flowchart according to an embodiment herein.

Further online tuning of a path for a connection of a service generated and established with the method is described as follows. As shown in FIG. 4, the method may further include options as follows.

In option 401, a tuning request for tuning the optical device node on the path for the connection of the service sent by the controller of the multiple domains of the SDON may be received.

The tuning request may include information on a tuning attribute.

In option 402, the parameter for configuring the attribute of the intra-domain cross connection may be modified according to the information on the tuning attribute.

When the path for the connection of the service is a path for the connection of the domain crossing service, the parameter for configuring the attribute of the intra-domain cross connection may be modified according to a part of request for intra-domain tuning in tuning information sent by a user of an application layer.

With the method, a user of an application layer may modify a tuning attribute of a node on a connection of a service online in SDON architecture, such that a parameter for configuring an attribute of a node on a path for a connection of a service may be modified online. A function of optical device attribute tuning per path hop is added, such that an attribute of an optical device is defined by software by attribute tuning.

Such a parameter for configuring an attribute of an intra-domain cross connection may include at least: a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier, etc.

Such a parameter for configuring an attribute of an intra-domain cross connection may be generated during establishment of a connection of a service. The generated parameter may be sent to an equipment layer to control routing of the equipment layer. Such a parameter for configuring an attribute of an intra-domain cross connection may be information on an Openflow entry of an optical cross connection (OXC), applying to any equipment of optical transmission, and in particular to equipment of optical transmission beyond 100G. An attribute of a port of an OXC may be defined according to a direction from a source to a destination of a connection of an OXC service as follows. An upstream port of a cross may be an optical input port. A downstream port of a cross may be an optical output port.

Information on an Openflow entry of an OXC mainly may include: a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier, etc., as shown in FIG. 7.

A center frequency may have a value in a form such as 193.1 THz+k*0.00625 THz (k being an integer). A channel spectral width may have a value in a form such as 12.5 GHz*h (h being a positive integer). A mode of modulation may have a value in a form such as 4, which stands for Dual Polarization-Quadrature Phase Shift Keying (DP-QPSK); 16, which stands for Dual Polarization multiplexing 16 Quadrature Amplitude Modulation (DP-16QAM); 64, which stands for Dual Polarization multiplexing 64 Quadrature Amplitude Modulation (DP-64QAM), etc.

A strategy of tuning hop by hop may include at least one tuning parameter of: spectral efficiency, a mode of modulation, a number of carriers, or tolerance for an Optical Signal-to-Noise Ratio (OSNR) of an optical transceiver; or a range of output power or a range of input power of an optical amplifier, etc.

With introduction of coherent reception, multi-carrier based Orthogonal Frequency Division Multiplexing (OFDM) is about to mature. For each connection of a service borne on multiple carriers in a system beyond 100G, information such as a mode of modulation, a signal spectral width, a center frequency of each carrier in an entry of an OXC, etc., may have to be determined. Two cases may be involved, mainly. For an equipment node on a connection of a service capable of hybrid scheduling of both light and electricity or capable of serving as a transponder in an optical transfer network (OTN). Information on an Openflow entry of an OXC at the optical input port and/or the optical output port may be derived by routing constraint and tuning strategy optimization respectively according to an indicator such as an upstream distance of transfer, a downstream distance of transfer of the OXC, tolerance for an OSNR, etc. For an equipment node capable of but optical crossing, a principle such as continuity, consistency of spectra, etc., may have to be followed, to ensure consistency of information on entries at an optical input port and an optical output port of a cross.

Mathematical model construction and algorithm call, as involved in executing the routing and tuning algorithm according to the routing constraint and the strategy of tuning hop by hop in aforementioned embodiments, is described below.

Based on information acquired in real time on performance of an optical device node at a domain boundary or inside a domain, topology of a network of an optical device node inside a domain (i.e., intra-domain optical device node) and an optical device node at a domain boundary, i.e., between domains (i.e., inter-domain optical device node), may be taken as a graph model G(N,L) with N nodes and L unidirectional links. A parameter related to the topology of the network and a service request may be expressed using a symbol as follows.

The N is a set of nodes in the network.

The L is a set of unidirectional links in the network.

The $L_{ij}$ is a unidirectional link from a source node i to a destination node j. The $L_{ij} \in L$.

Correspondence between a distance of transfer of an optical channel in the network and spectral efficiency may be as follows.

$$R(b,\eta) = \alpha b^{-1} + \beta \eta^{-} + \gamma$$

The R(b,η) may be the distance of transfer, in units of Km.

The α,β,γ may be optimizing coefficients.

The b may be a bit rate of transfer, in units of Gbps.

The η may be the spectral efficiency, in units of bit/symbol (bit per symbol). The spectral efficiency may be in one-on-one correspondence with the mode of modulation.

Namely, a certain mode of modulation will produce a spectral efficiency corresponding to the certain mode of modulation. The correspondence between a distance of transfer of an optical channel and spectral efficiency is the correspondence between a distance of transfer of an optical channel and a mode of modulation.

A parameter of the service request and network configuration related to a request for establishing a connection of a service may be defined as follows.

D may stand for a set of unidirectional service requests.

$D_{sd}$ may stand for a unidirectional service request from a source node s to a destination node d. The $D_{sd} \in D$.

$b_{sd}$ may stand for a bit rate required by a service $D_{sd}$, in units of Gbps.

$\eta_{sd}$ may stand for a spectral efficiency corresponding to a designated mode of modulation.

$S_{n,sd}$ may stand for a relation between a service request and a node. If a node $\eta$ is the source node of a service request $D_{sd}$ (i.e., n=s), then $S_{n,sd}$=-1. If the node n is the destination node of the service request $D_{sd}$ (i.e., n=d), then $S_{n,sd}$=1. Otherwise, $S_{n,sd}$=0 (i.e., n≠s, n≠d).

G may be a bandwidth of protective spectra, in units of GHz.

A parameter of a spectrum resource of the network related to a request for establishing a connection of a service may be defined as follows.

c may be an index of a maximal frequency any service uses.

$F_{sd}$ may be an index of a starting frequency occupied by a service request $D_{sd}$.

$V_{ij,sd}$ may stand for an attribute for assigning a link. If a link $L_{ij}$ is assigned to a service $D_{sd}$, then $V_{ij,sd}$=1. Otherwise, $V_{ij,sd}$=0.

$\delta_{sd,s'd'}$ may identify a sequence of indices of starting frequencies occupied by service requests $D_{sd}$ and $D_{s'd'}$. If $F_{sd} \leq F_{s'd'}$, $\delta_{sd,s'd'}$=1. If $F_{sd} > F_{s'd'}$, $\delta_{sd,s'd'}$=0.

A spectrum may be assigned under a constraint as follows.

$$c \geq F_{sd} + B_{sd}, \forall D_{sd} \in D$$

$B_{sd}$ may be a bandwidth of spectra required by a service request $D_{sd}$ under a designated spectral efficiency $\eta_{sd}$. $B_{sd} = b_{sd} \times \eta_{sd}^{-1}$.

A path for a service may be of no loopback under a constraint as follows.

$$\sum_{L_{ij} \in L, j=n} V_{ij,sd} - \sum_{L_{ij} \in L, i=n} V_{ij,sd} = S_{n,sd},$$

$$\forall n \in N, D_{sd} \in D$$

Spectra may be of no overlap under a constraint as follows.

$$\forall D_{sd}, D_{s'd'} \in D,$$

$$\delta_{sd,s'd'} + \delta_{s'd',sd} = 1$$

$$F_{sd} - F_{s'd'} \leq T(1 - \delta_{sd,s'd'} + 2 - V_{ij,sd} - V_{ij,s'd'})$$

$$F_{sd} - F_{s'd'} + B_{sd} + G \leq (T+G) \times (1 - \delta_{sd,s'd'} + 2 - V_{ij,sd} - V_{ij,s'd'})$$

The T may stand for any spectrum resource required by a service of the network. $T = \sum_{D_{sd} \in D} b_{sd} \times \eta_{sd}^{-1}$.

$\eta_{sd}^{-1}$ may stand for the spectral efficiency of the service $D_{sd}$. $\eta_{sd,MIN}^{-1} \leq \eta_{sd}^{-1} \leq \eta_{sd,MAX}^{-1}$.

An optical device, such as that in an elastic optical network beyond 100G, may be defined by software as follows.

A resource, such as a wavelength, a mode of modulation, a bandwidth of spectra, a center frequency, etc., occupied by a service, may be transformed and adjusted flexibly on a renewable optical electric optical (OEO) transponder on a path for the service in an elastic optical network beyond 100G Generally, such an OEO transponder node may be referred to as a renewable node. A network containing a renewable node may be considered in two scenes of application as follows.

In scene 1, a renewable node on a path for a service has been preset in a request for establishing a connection of a service sent by an application layer.

In scene 2, a renewable node on a path for a service is not preset, and may have to be computed dynamically.

A parameter thereof may be defined as follows.

$l_{ij}$ may be a length of a link $L_{ij}$, in units of Km.

$R_{sd}$ may be a distance of transfer of a service $D_{sd}$ corresponding to a designated spectral efficiency.

$N^r$ may be a set of renewable nodes.

$Y_{n,sd}$ may be a distance from a node n on an optical channel to a source end of a pass-through segment on the optical channel that a service $D_{sd}$ passes through, if the node n is on the optical channel assigned to the service $D_{sd}$. Otherwise if the node n is not on the optical channel assigned to the service $D_{sd}$, $Y_{n,sd}$=0.

$U_{ij,sd}$ may be a distance from a node i on an optical channel to a source end of a pass-through segment on the optical channel that a service $D_{sd}$ passes through, if an entire link $L_{ij}$ has been assigned to the service $D_{sd}$. Otherwise if not the entire link $L_{ij}$ has been assigned to the service $D_{sd}$ ($V_{ij,sd}$=0), then $U_{ij,sd}$=0. Namely, $U_{ij,sd} = V_{ij,sd} Y_{i,sd}$ with no other constraint.

$I_n$ may stand for a renewable node. If the node n is a renewable node, then $I_n$=1. Otherwise $I_n$=0.

$N_{n,c}$ may be a number of renewable electrical channels on a node n.

$I_{n,sd}$ may stand for renewability of the node n. If a service $D_{sd}$ is renewable at the node n, then $I_{n,sd}$=1. Otherwise, $I_{n,sd}$=0. If $I_{n,sd}$=1, then the node n must be a renewable node, namely, $I_n$=1, and a renewable electrical layer channel of the node is used by the service $D_{sd}$.

$X_{ij,sd}$ may be for computing a distance of $Y_{n,sd}$, and may take on a value based on whether renewability is produced at a node i. If $I_{i,sd}$=0, $X_{ij,sd} = U_{ij,sd}$. Otherwise $X_{ij,sd}$=0.

With scene 1, a constraint as follows may have to be taken into account.

$$U_{ij,sd} \leq V_{ij,sd} R_{sd}$$

$$U_{ij,sd} \leq y_{i,sd}$$

$$Y_{i,sd} - U_{ij,sd} \leq R_{sd}(1 - V_{ij,sd})$$

$$Y_{n,sd} = \begin{cases} \text{if } \exists L_{ij}, i \in N^r \text{ and } V_{ij,sd} = 1, \sum_{L_{ij} \in L: j=n} l_{ij} V_{ij,sd} \\ \text{otherwise, } \sum_{L_{ij} \in L: j=n} U_{ij,sd} + l_{ij} V_{ij,sd} \end{cases}$$

With scene 2, a constraint as follows may have to be taken into account.

$$Y_{n,sd} = \sum_{L_{ij} \in L: j=n} X_{ij,sd} + l_{ij} V_{ij,sd}$$

A number of OEO electrical channels on each renewable node may be limited by a constraint as follows.

$$N_{n,c} = \sum_{D_{sd} \in D} I_{n,sd}$$

$$I_n N_{n,cMAX} \geq N_{n,c}$$

A parameter thereof may be defined as follows.

The $N_{n,cMAX}$ may be a maximal number of renewable electrical channels a renewable node n may have.

When a node in the network supports wavelength transformation, frequency of a link occupied by a service input to a renewable node may differ from that output by the node. To express such flexibility in frequency scheduling, a starting frequency may be defined along a link a service goes through, with a parameter thereof being defined as follows.

$F_{ij,sd}$ may be an index of a starting frequency of a service $D_{sd}$ on a link $L_{ij}$.

$\eta_{sd,ij}^{-1}$ may be a reciprocal of a spectral efficiency of the service $D_{sd}$ on the link $L_{ij}$.

In this case, spectra may be of no overlap under a constraint as follows.

$$\sum_{L_{ij} \in L: j=n} F_{ij,sd} - \sum_{L_{ij} \in L: i=n} F_{ij,sd} \geq -T \times (I_{n,sd} + |S_{n,sd}|)$$

$$\sum_{L_{ij} \in L: j=n} F_{ij,sd} - \sum_{L_{ij} \in L: i=n} F_{ij,sd} \leq T \times (I_{n,sd} + |S_{n,sd}|)$$

According to such a constraint, if a node n is an intermediate node on a service $D_{sd}$, i.e., n≠s,n≠d, and for the service $D_{sd}$, the node n supports no renewability, then a distribution of starting frequencies input to the node n must equal a distribution of starting frequencies output by the node n.

Similar to wavelength transformation, when a node supports transformation of a mode of modulation, a spectral efficiency of a link a service passes through may differ. Namely, a spectral efficiency of an upstream link of an intermediate renewable node a service passes through may differ from that of a downstream link of the node. A spectral efficiency may be defined along a link a service goes through. Namely, a mode of modulation may be transformed under a constraint as follows.

$$\sum_{L_{ij} \in L: j=n} \eta_{sd,ij}^{-1} - \sum_{L_{ij} \in L: i=n} \eta_{sd,ij}^{-1} \geq -\eta_{sd,MAX}^{-1} \times (I_{n,sd} + |S_{n,sd}|)$$

$$\sum_{L_{ij} \in L: j=n} \eta_{sd,ij}^{-1} - \sum_{L_{ij} \in L: i=n} \eta_{sd,ij}^{-1} \leq \eta_{sd,MAX}^{-1} \times (I_{n,sd} + |S_{n,sd}|)$$

According to such a constraint (similar to a constraint for wavelength transformation), a mode of modulation may be transformed but on a node supporting service renewability. Namely, $I_{n,sd}=1$.

According to the constraint, considering a cost of using a resource of a renewable node, a target function as follows may be built to balance use of an optical spectral resource and the cost of a renewable resource.

$$\min\left\{ac + (1-a)\sum_{n \in N} I_n\right\} \quad (16)$$

The coefficient $a \in [0,1]$ may stand for a relation between costs of using the two resources. The target function may serve to minimize a sum of costs of using the two resources according to a designated relation between the costs. When the relation between costs of the two resources cannot be determined, the two resources may be assigned using the formula (16) according to a state of resource configuration for actual equipment.

To sum up, while a routing and tuning algorithm is being executed according to the routing constraint and the strategy of tuning hop by hop, a mathematical model for implementing the routing and tuning algorithm may be constructed. An aforementioned constraint, the target function may serve as a condition, a parameter, etc., input to the algorithm. Mixed Integer Linear Programming (MILP) may be executed. Finally, an optical spectrum, a renewable resource, etc., such as a number of carriers, a center frequency, a channel spectral width, a mode of modulation per hop on a path for an inter-domain/intra-domain service, etc., may be assigned.

Figure 5:
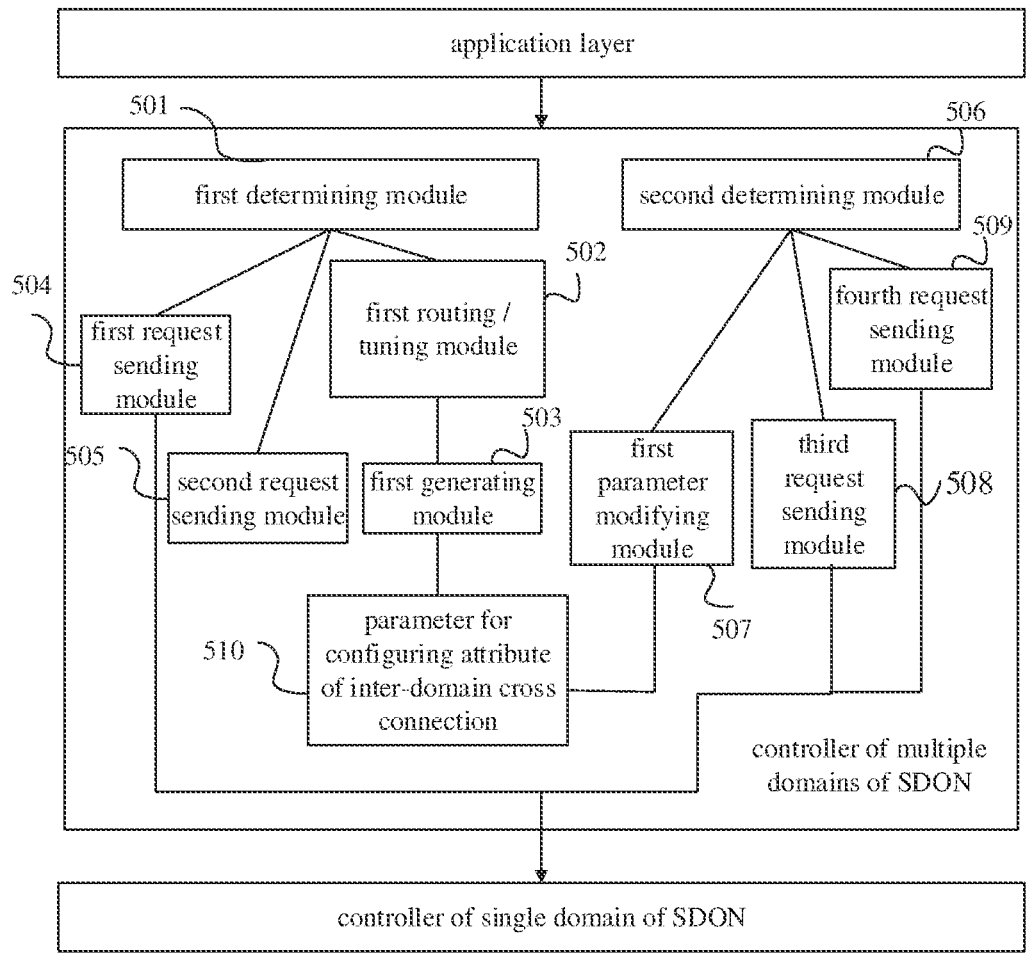
FIG. 5 is a block diagram of an overall structure according to an embodiment herein.

As shown in FIG. 5, system for implementing Software Definition of an Optical device (SDO) includes a first determining module 501, a first routing/tuning module 502, and a first generating module 503.

The first determining module 501 is arranged for: in response to receiving a request for establishing a connection of a service sent by an application layer, determining whether the request for establishing the connection of the service is a request for establishing a connection of a domain crossing service. The request for establishing the connection of the service includes a routing constraint on routing of a connection to be established and a strategy of tuning hop by hop.

The first routing/tuning module 502 is arranged for: in response to determining that the request is for a domain crossing service, executing a routing and tuning algorithm according to the routing constraint and the strategy of tuning hop by hop, and according to information on performance of an optical device node at a domain boundary and information on a request for establishing a connection of an inter-domain service. Both the information on the performance of the optical device node at the domain boundary and the information on the request for establishing the connection of the inter-domain service are included in the request for establishing the connection of the service.

The first generating module 503 is arranged for: generating, according to a result of executing the routing and tuning algorithm, a path for the connection of the inter-domain service and a parameter for configuring an attribute of an inter-domain cross connection 510. The path for the connection of the inter-domain service corresponds to the information on the request for establishing the connection of the inter-domain service. The parameter for configuring the attribute of the inter-domain cross connection 510 is of an optical device node on the path for the connection of the inter-domain service.

Such a parameter for configuring an attribute of an inter-domain cross connection 510 may be generated during establishment of a connection of a service. The generated parameter may be sent to an equipment layer to control routing of the equipment layer, to complete software definition of an optical device. Such a parameter for configuring an attribute of an inter-domain cross connection 510 may be information on an Openflow entry of an optical cross connection (OXC), applying to any equipment of optical transmission, and in particular to equipment of optical transmission beyond 100G.

The system may further include a first request sending module 504.

The first request sending module 504 may be arranged for: in response to determining that the request is for no domain crossing service, sending the request for establishing the connection of the service to a controller of a single domain of a Software Defined Optical Network (SDON) corresponding to the request for establishing the connection of the service.

The system may further include a second request sending module 505.

The second request sending module 505 may be arranged for: in response to determining that the request is for a domain crossing service, sending information on a request for establishing a connection of an intra-domain service in the request for establishing the connection of the service to a controller of a single domain of a Software Defined Optical Network (SDON) corresponding to the request for establishing the connection of the intra-domain service.

The system may further include a second determining module 506 and a first parameter modifying module 507.

The second determining module 506 may be arranged for: in response to receiving a tuning request for tuning an optical device node on a path for a connection of a service sent by the application layer, determining whether the path for the connection of the service is a path for the connection of the domain crossing service. The tuning request may include information on a tuning attribute.

The first parameter modifying module 507 may be arranged for: in response to determining that the path is for the domain crossing service, modifying the parameter for configuring the attribute of the inter-domain cross connection 510 according to the information on the tuning attribute and tuning request information corresponding to the path for the connection of the inter-domain service in the tuning request.

The system may further include a third request sending module 508.

The third request sending module 508 may be arranged for: in response to determining that the path is for the domain crossing service, sending tuning request information corresponding to a path for a connection of an intra-domain service in the tuning request to a controller of a single domain of a Software Defined Optical Network (SDON) corresponding to the path for the connection of the intra-domain service.

The system may further include a fourth request sending module 509.

The fourth request sending module 509 may be arranged for: in response to determining that the path is for no domain crossing service, sending the tuning request to a controller of a single domain of a Software Defined Optical Network (SDON) corresponding to the tuning request.

Such a parameter for configuring an attribute of an inter-domain cross connection may include at least: a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier, etc.

A strategy of tuning hop by hop may include at least one tuning parameter of: spectral efficiency, a mode of modulation, a number of carriers, or tolerance for an Optical Signal-to-Noise Ratio (OSNR) of an optical transceiver; or a range of output power or a range of input power of an optical amplifier, etc.

The system for implementing SDO may be a controller of multiple domains of an SDON.

With the system, based on connection path computation of an existing controller of an SDON, optical device tuning per path hop is added on basis of architecture of a controller of an SDON. Path tuning is added during establishment of a connection of a service. An attribute of an optical device is defined by software by attribute tuning. A user of an application layer may modify a parameter for configuring an attribute of an inter-domain cross connection of a node on a path for a connection of a service online in SDON architecture. A function of optical device attribute tuning per path hop is added, implementing an important functional mechanism of SDO, to allow a user of an application layer to program and define a resource of an elastic optical device beyond 100G.

Figure 6:
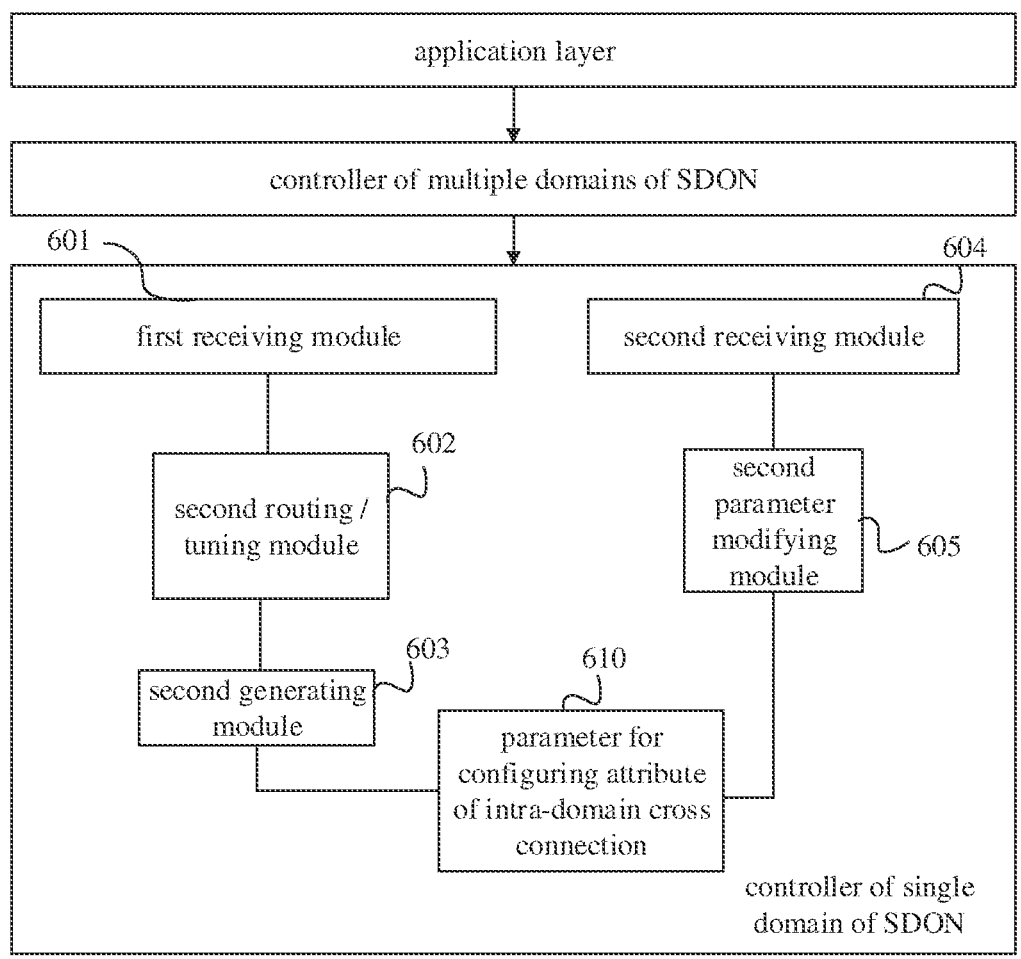
FIG. 6 is a block diagram of an overall structure according to an embodiment herein.

As shown in FIG. 6, a system for implementing Software Definition of an Optical device (SDO) herein includes a first receiving module 601, a second routing/tuning module 602, and a second generating module 603.

The first receiving module 601 is arranged for: receiving a request for establishing a connection of a service sent by a controller of multiple domains of a Software Defined Optical Network (SDON). The request for establishing the connection of the service includes a routing constraint on routing of a connection to be established and a strategy of tuning hop by hop.

The second routing/tuning module 602 is arranged for: executing a routing and tuning algorithm according to the routing constraint, the strategy of tuning hop by hop, the request for establishing the connection of the service, and information on performance of an optical device node inside a domain.

The second generating module 603 is arranged for: generating, according to a result of executing the routing and tuning algorithm, a path for the connection of the service corresponding to the request for establishing the connection of the service and a parameter for configuring an attribute of an intra-domain cross connection 610 of an optical device node on the path for the connection of the service.

Such a parameter for configuring an attribute of an intra-domain cross connection 610 may be generated during establishment of a connection of a service. The generated parameter may be sent to an equipment layer to control routing of the equipment layer, to complete software definition of an optical device. Such a parameter for configuring an attribute of an intra-domain cross connection 610 may be information on an Openflow entry of an optical cross connection (OXC), applying to any equipment of optical transmission, and in particular to equipment of optical transmission beyond 100G.

The system may further include a second receiving module 604 and a second parameter modifying module 605.

The second receiving module 604 may be arranged for: receiving a tuning request for tuning the optical device node on the path for the connection of the service sent by the controller of the multiple domains of the SDON. The tuning request may include information on a tuning attribute.

The second parameter modifying module 605 may be arranged for: modifying the parameter for configuring the attribute of the intra-domain cross connection 610 according to the information on the tuning attribute.

Such a parameter for configuring an attribute of an intra-domain cross connection 610 may include at least: a number of an optical input port; a number of optical input carriers; a center frequency adopted by an optical input carrier; a channel spectral width adopted by the optical input carrier; a mode of modulation adopted by the optical input carrier; a number of an optical output port, a number of optical output carriers; a center frequency adopted by an optical output carrier; a channel spectral width adopted by the optical output carrier; and a mode of modulation adopted by the optical output carrier, etc.

A strategy of tuning hop by hop may include at least one tuning parameter of: spectral efficiency, a mode of modulation, a number of carriers, or tolerance for an Optical Signal-to-Noise Ratio (OSNR) of an optical transceiver; or a range of output power or a range of input power of an optical amplifier, etc.

The system for implementing SDO may be a controller of a single domain of an SDON.

With the system, based on connection path computation of an existing controller of an SDON, optical device tuning per path hop is added on basis of architecture of a controller of an SDON. Path tuning is added during establishment of a connection of a service. An attribute of an optical device is defined by software by attribute tuning. A user of an application layer may modify a parameter for configuring an attribute of an intra-domain cross connection of a node on a path for a connection of a service online in SDON architecture. A function of optical device attribute tuning per path hop is added, implementing an important functional mechanism of SDO, to allow a user of an application layer to program and define a resource of an elastic optical device beyond 100G.

A system of an SDON herein may include the system for implementing SDO according to the embodiment and the system for implementing SDO according to the previous embodiment.

What described are embodiments herein. Note that those skilled in the art may make various modification and variations without departing from the principle of the present disclosure. Such modification and variations also fall in the protection scope of the present disclosure.

INDUSTRIAL APPLICABILITY

With embodiments herein, a novel system of an SDON is designed based on connection path computation of an existing controller of an SDON. Optical device tuning per path hop is added on basis of architecture of a controller of an SDON. Path tuning is added during establishment of a connection of a service. An attribute of an optical device is defined by software by attribute tuning, implementing an important functional mechanism of SDO, to allow a user of an application layer to program and define a resource of an elastic optical device beyond 100G

The invention claimed is:

1. A method for implementing Software Definition of an Optical device (SDO), comprising:
    in response to receiving a request for establishing a connection of a service sent by an application layer, determining whether the request for establishing the connection of the service is a request for establishing a connection of a domain crossing service, the request for establishing the connection of the service comprising a routing constraint on routing of a connection to be established and a strategy of tuning hop by hop;
    in response to determining that the request for establishing the connection of the service is the request for establishing the connection of the domain crossing service, executing a routing and tuning algorithm according to the routing constraint and the strategy of tuning hop by hop, and according to information on performance of an optical device node at a domain boundary and information on a request for establishing a connection of an inter-domain service, both the information on the performance of the optical device node at the domain boundary and the information on the request for establishing the connection of the inter-domain service being comprised in the request for establishing the connection of the service; and
    generating, according to a result of executing the routing and tuning algorithm, a path for the connection of the inter-domain service and a parameter for configuring an attribute of an inter-domain cross connection, the path for the connection of the inter-domain service corresponding to the information on the request for establishing the connection of the inter-domain service, the parameter for configuring the attribute of the inter-domain cross connection being of an optical device node on the path for the connection of the inter-domain service, wherein
    after the determining whether the request for establishing the connection of the service is the request for establishing the connection of the domain crossing service,
    in response to determining that the request for establishing the connection of the service is not the request for establishing the connection of the domain crossing service, sending the request for establishing the connection of the service to a controller of a single domain of a Software Defined Optical Network (SDON) corresponding to the request for establishing the connection of the service.

2. The method of claim 1, further comprising: after the determining whether the request for establishing the connection of the service is the request for establishing the connection of the domain crossing service,
    in response to determining that the request for establishing the connection of the service is the request for establishing the connection of the domain crossing service, sending information on a request for establishing a connection of an intra-domain service in the request for establishing the connection of the service to a controller of a single domain of a SDON corresponding to the request for establishing the connection of the intra-domain service.

3. The method of claim 1, further comprising: after the generating, according to the result of executing the routing and tuning algorithm, the path for the connection of the inter-domain service and the parameter for configuring the attribute of the inter-domain cross connection,
    in response to receiving a tuning request for tuning an optical device node on a path for the connection of the service sent by the application layer, determining whether the path for the connection of the service is a path for the connection of the domain crossing service, the tuning request comprising information on a tuning attribute; and
    in response to determining that the path for the connection of the service is the path for the connection of the domain crossing service, modifying the parameter for configuring the attribute of the inter-domain cross connection according to the information on the tuning attribute and tuning request information corresponding to the path for the connection of the inter-domain service in the tuning request.

4. The method of claim 3, further comprising: after the determining whether the path for the connection of the service is the path for the connection of the domain crossing service,
  in response to determining that the path for the connection of the service is the path for the connection of the domain crossing service, sending tuning request information corresponding to a path for a connection of an intra-domain service in the tuning request to a controller of a single domain of a SDON corresponding to the path for the connection of the intra-domain service.

5. The method of claim 3, further comprising: after the determining whether the path for the connection of the service is the path for the connection of the domain crossing service,
  in response to determining that the path for the connection of the service is not the path for the connection of the for no domain crossing service, sending the tuning request to a controller of a single domain of a SDON corresponding to the tuning request.

6. The method of claim 1, wherein the strategy of tuning hop by hop comprises
  at least one tuning parameter of: spectral efficiency of an optical transceiver, a mode of modulation of the optical transceiver, a number of carriers of the optical transceiver, tolerance for an Optical Signal-to-Noise Ratio (OSNR) of the optical transceiver, a range of output power of an optical amplifier, or a range of input power of the optical amplifier.

7. A method for implementing Software Definition of an Optical device (SDO), comprising:
  receiving a request for establishing a connection of a service sent by a controller of multiple domains of a Software Defined Optical Network (SDON), the request for establishing the connection of the service comprising a routing constraint on routing of the connection to be established and a strategy of tuning hop by hop;
  executing a routing and tuning algorithm according to the routing constraint, the strategy of tuning hop by hop, the request for establishing the connection of the service, and information on performance of an optical device node inside a domain;
  generating, according to a result of executing the routing and tuning algorithm, a path for the connection of the service corresponding to the request for establishing the connection of the service and a parameter for configuring an attribute of an intra-domain cross connection of an optical device node on the path for the connection of the service;
  receiving a tuning request for tuning the optical device node on the path for the connection of the service sent by the controller of the multiple domains of the SDON, the tuning request comprising information on a tuning attribute; and
  modifying the parameter for configuring the attribute of the intra-domain cross connection according to the information on the tuning attribute.

8. The method of claim 7, wherein the strategy of tuning hop by hop comprises
  at least one tuning parameter of: spectral efficiency of an optical transceiver, a mode of modulation of the optical transceiver, a number of carriers of the optical transceiver, tolerance for an Optical Signal-to-Noise Ratio (OSNR) of the optical transceiver, a range of output power of an optical amplifier, or a range of input power of the optical amplifier.

9. A system for implementing Software Definition of an Optical device (SDO), comprising:
  a processor; and
  memory storing instructions executable by the processor for carrying out the method of claim 1.

10. The system of claim 9, wherein the method further comprises: after the determining whether the request for establishing the connection of the service is the request for establishing the connection of the domain crossing service,
  in response to determining that the request for establishing the connection of the service is the request for establishing the connection of the domain crossing service, sending information on a request for establishing a connection of an intra-domain service in the request for establishing the connection of the service to a controller of a single domain of a SDON corresponding to the request for establishing the connection of the intra-domain service.

11. The system of claim 9, wherein the method further comprises: after the generating, according to the result of executing the routing and tuning algorithm, the path for the connection of the inter-domain service and the parameter for configuring the attribute of the inter-domain cross connection,
  in response to receiving a tuning request for tuning an optical device node on a path for the connection of the service sent by the application layer, determining whether the path for the connection of the service is a path for the connection of the domain crossing service, the tuning request comprising information on a tuning attribute; and
  in response to determining that the path for the connection of the service is the path for the connection of the domain crossing service, modifying the parameter for configuring the attribute of the inter-domain cross connection according to the information on the tuning attribute and tuning request information corresponding to the path for the connection of the inter-domain service in the tuning request.

12. The system of claim 11, wherein the method further comprises at least one of:
  after the determining whether the path for the connection of the service is the path for the connection of the domain crossing service, in response to determining that the path for the connection of the service is the path for the connection of the domain crossing service, sending tuning request information corresponding to a path for a connection of an intra-domain service in the tuning request to a controller of a single domain of a SDON corresponding to the path for the connection of the intra-domain service, or
  after the determining whether the path for the connection of the service is the path for the connection of the domain crossing service, in response to determining that the path for the connection of the service is not the path for the connection of the domain crossing service, sending the tuning request to a controller of a single domain of a SDON corresponding to the tuning request.

13. A system for implementing Software Definition of an Optical device (SDO), comprising:
- a processor; and
- memory storing instructions executable by the processor for carrying out the method of claim 7.

14. A system of a (SDON), comprising the system of claim 9 and a second system for implementing SDO, the second system comprising:
- a second processor; and
- second memory storing instructions executable by the second processor for:
- receiving a request for establishing a connection of a service sent by a controller of multiple domains of the SDON, the request for establishing the connection of the service comprising a routing constraint on routing of the connection to be established and a strategy of tuning hop by hop;
- executing a routing and tuning algorithm according to the routing constraint, the strategy of tuning hop by hop, the request for establishing the connection of the service, and information on performance of an optical device node inside a domain; and
- generating, according to a result of executing the routing and tuning algorithm, a path for the connection of the service corresponding to the request for establishing the connection of the service and a parameter for configuring an attribute of an intra-domain cross connection of an optical device node on the path for the connection of the service.

* * * * *